United States Patent [19]

Nakagawa

[11] Patent Number: 5,356,533
[45] Date of Patent: Oct. 18, 1994

[54] BUBBLING SYSTEM

[75] Inventor: Turuo Nakagawa, Amagasaki, Japan

[73] Assignee: F. Tecs Co., Ltd., Osaka, Japan

[21] Appl. No.: 51,375

[22] Filed: Apr. 23, 1993

[30] Foreign Application Priority Data

May 14, 1992 [JP] Japan ................... 4-148600

[51] Int. Cl.$^5$ ................. B01D 17/035; C02F 1/24
[52] U.S. Cl. ..................... 210/123; 210/195.1; 210/197; 210/199; 210/220; 210/221.2; 210/170; 210/703; 261/36.1
[58] Field of Search ............ 210/123, 125, 129, 195.1, 210/197, 221.2, 199, 170, 220, 703; 261/36.1, DIG. 75

[56] References Cited

U.S. PATENT DOCUMENTS

| | | |
|---|---|---|
| 2,039,950 | 5/1936 | Chandler, Jr. . |
| 2,765,919 | 10/1956 | Juell ...................... 210/202 |
| 3,015,396 | 1/1962 | Quast ................... 210/221.2 |
| 3,286,844 | 11/1966 | Juell ...................... 210/523 |
| 3,286,992 | 11/1966 | Armendiabes ........... 261/79.2 |
| 3,542,675 | 11/1970 | Mail ........................ 210/703 |
| 3,679,056 | 7/1972 | Haymore ............... 210/225 |
| 4,031,006 | 6/1977 | Ramirez .................. 209/170 |
| 4,146,472 | 3/1979 | Treyssac ............... 210/221.2 |
| 4,216,085 | 8/1980 | Chittenden ............. 210/221.2 |
| 4,274,959 | 6/1981 | Roediger ................ 210/221.2 |
| 4,337,152 | 6/1982 | Lynch . |
| 4,338,192 | 7/1982 | Krasnoff ................. 210/703 |
| 4,370,304 | 1/1983 | Hendriks ............. 261/DIG. 75 |
| 4,492,636 | 1/1985 | Burke ..................... 210/706 |
| 4,572,786 | 2/1986 | Endo ...................... 210/202 |
| 4,674,888 | 6/1987 | Carlson ..................... 261/94 |
| 4,681,682 | 7/1987 | White ..................... 210/221.2 |
| 4,981,582 | 1/1991 | Yoon ...................... 210/221.2 |
| 5,139,663 | 8/1992 | Maples ................... 210/221.2 |
| 5,158,678 | 10/1992 | Broussard .............. 210/221.2 |
| 5,167,798 | 12/1992 | Yoon ...................... 210/221.2 |

FOREIGN PATENT DOCUMENTS

| | | |
|---|---|---|
| 0264905 | 4/1988 | European Pat. Off. . |
| 0324099 | 7/1989 | European Pat. Off. . |
| 2262016 | 6/1974 | Fed. Rep. of Germany . |
| 3536057 | 4/1987 | Fed. Rep. of Germany . |
| 2209601 | 7/1974 | France . |
| 2282936 | 3/1976 | France . |
| 2339431 | 8/1977 | France . |
| 2598333 | 11/1987 | France . |
| 2-112321 | 9/1990 | Japan . |
| 633378 | 12/1949 | United Kingdom . |
| 1024870 | 4/1966 | United Kingdom . |
| 2013095 | 8/1979 | United Kingdom . |

OTHER PUBLICATIONS

Kawashima et al., *Eisei-Kogaku* (Sanitary Engineering), Meigensha Co., Ltd., Apr. 20, 1977 (latest ed. Apr. 10, 1990), Chapters 2.2.4–2.3.4.

*Primary Examiner*—Thomas M. Lithgow
*Attorney, Agent, or Firm*—Armstrong, Westerman, Hattori, McLeland & Naughton

[57] ABSTRACT

A system for cleaning water in rivers or lakes or for separating oil and water. The system includes a sucking pipe; vapor-liquid mixing device connecting to the sucking pipe; a pressure pump disposed midway of the sucking pipe; a compressor connected to the connection between the pressure pump and the vapor-liquid mixing device; a pressure tank connected to the vapor-liquid mixing device; a feed pipe connected to the pressure tank; and a pressure valve, attached to the leading end of the feed pipe, which opens at a pressure exceeding a predetermined level. According to this system, the construction can be simplified, and the lifting action by the bubbles can be effected by keeping the pressure of the liquid at a predetermined level or more at all times. Thus, the system can be used anywhere under all circumstances.

11 Claims, 4 Drawing Sheets

BUBBLING SYSTEM

BACKGROUND OF THE INVENTION

1. Field of the Invention

The present invention relates to a bubbling system to be used as either a cleaning system for cleaning water of rivers or lakes or an oil-water separating system for separating oil in water. More particularly, the present invention relates to a bubbling system for use in either a cleaning system using the floating separation method or an oil-water separating system.

2. Description of the Prior Art

According to the cleaning method resorting to the existing floating separation, a flocculating agent is poured into stock water to be cleaned and is stirred in a flocculating bath. After this, a portion of the flocculated and stirred liquid is extracted and has air dissolved therein to prepare pressure water. This pressure water is mixed again with the remaining flocculated and stirred liquid to stick the air bubbles to the floc in the liquid so that the floc is lifted together with the air bubbles to flow into a separating bath. Moreover, an oil-water separation is also carried out by a similar method, in which air bubbles are stuck to the oil mixed in the water.

The cleaning or the oil-water separation using the floating separation makes use of the sticking action of the air bubbles which are produced from the pressure water containing the dissolved air, as described above. This bubble sticking action higher as the pressure changes more extensively when the bubbles expand and break in the water. This pressure change is the wider for smaller bubbles, as the pressure of the water is higher. On the other hand, the sticking action of the bubbles higher for a larger the more content of the air dissolved in the water, as the pressure of the water becomes higher. It is therefore concluded that the floating effect by the sticking of the bubbles is higher for the higher pressure of the water.

In the existing floating separation described above, however, the pressure water having the air dissolved therein has already released its pressure at the instant when it is mixed with the flocculated and stirred liquid, so that the air dissolved in the water changes into the air bubbles and its air content drops. At the same time, as a result of the pressure drop, moreover, the bubbles have expanded to reduce the pressure change at the time of expansion and breakage of the bubbles in the flocculating/stirring bath. Thus, a sufficient floating action cannot be attained by the sticking of the bubbles. Still the worse, the system used in the existing floating separation has to be a closed one which requires: the flocculating/stirring bath for injecting and stirring the flocculating agent into the stock water to be cleaned; and the floating separation bath for floating and separating the bubbles of the air dissolved in the pressure water by sticking them to the flock. As a result, the system has its size enlarged and is limited in its place and movement. Thus, the system is difficult to use in positions other than the specified place so that it can hardly cope with the cases in which rivers or lakes are to be cleaned.

BRIEF SUMMARY OF THE INVENTION

In view of the state of the existing cleaning method and oil-water separation using the aforementioned floating separating method, therefore, the present invention has an object to provide a bubbling system capable of dissolving a large amount of air in a liquid to be treated. Thus producing remarkably fine bubbles, by which it is enabled to lift the flock or oil in a liquid to be treated, and simplifying its construction so that it can be used for all situations and in all places to clean a river or lake and to separate the oil from the water.

In order to achieve the above-specified object, according to the present invention, there is provided a bubbling system comprising: a sucking pipe; vapor-liquid mixing means connecting to said sucking pipe; a pressure pump disposed midway of said sucking pipe; a compressor connected to the connection between said pressure pump and said vapor-liquid mixing means; a pressure tank connected to said vapor-liquid mixing means; a feed pipe connected to said pressure tank; and a pressure valve attached to the leading end of said feed pipe.

In this bubbling system, the liquid sucked up via the sucking pipe by the pressure pump and the compressed gas coming from the compressor are simultaneously fed to the gas-liquid mixing means and are mixed under pressure so that the gas may be dissolved into the liquid. If the liquid containing the gas dissolved therein under pressure is fed again from the pressure pump via the feed pipe and further from the pressure valve at the leading end of the feed pipe again into the liquid, as the pressure liquid is vented to the atmosphere. As a result, the gas dissolved in the pressure water changes into the fine bubbles and the fine bubbles are allowed to expand and lift in the treated liquid. In the present invention, the pressure valve is disposed at the leading end of the feed pipe so that the pressure liquid to be fed from the feed pipe is kept under the predetermined pressure till it reaches the leading end of the feed pipe. As a result, the gas dissolved in the pressure liquid remain remarkably dissolved till they are opened to the liquid. And the gas changes into bubbles when opened to the liquid so that remarkably fine bubbles can be produced in the liquid. Moreover, the amount of the gas dissolved in the liquid can always be kept in a predetermined amount or more. Moreover, this bubbling system can maintain the predetermined pressure up to the leading end of the feed pipe for the pressure liquid, as described above, so that the remarkably fine bubbles can be produced even at a place remote from the place of the pressure pump, the gas-liquid mixing means and the pressure tank constituting the system by extending the feed pipe, if necessary.

On the other hand, a cleaning system according to the present invention using the aforementioned bubbling system is constructed to comprise: a pressure pump for feeding the sucked stock liquid sucked up from a portion be treated to vapor-liquid mixing means; a compressor for feeding a compressed gas into the stock liquid; vapor-liquid mixing means for mixing the stock liquid fed by said pressure pump and the compressed gas fed from said compressor, to mix and dissolve the gas into the liquid; a pressure tank for reserving the pressure liquid having said gas mixed and dissolved therein; a feed pipe for feeding the pressure liquid of said pressure tank to said treated portion; and a pressure valve attached to the leading end of said feed pipe and adapted to be opened at a pressure exceeding a predetermined level.

In the cleaning system according to the present invention, the stock liquid sucked up from the treated portion by the pressure pump and the compressed gas coming from the compressor are simultaneously fed to the gas-liquid mixing means, by which they are mixed under pressure so that the gas is dissolved in the liquid. Next, with the pressure valve at the leading end of the feed pipe being positioned in the treated portion, the pressure liquid having the gas dissolved therein is fed from the pressure tank via the feed pipe and further from the pressure valve into the liquid to be treated. Then, the pressure liquid is opened in the liquid to be treated to the gas dissolved in the pressure water changes into the fine bubbles and the atmosphere so that the fine bubbles expand and rise in the liquid to be treated to stick to the flock in the liquid thereby to lift the flock.

In case of cleaning the aforementioned treated liquid, the gas dissolved in the pressure liquid to be fed to the treated portion keeps dissolved till it is released from the aforementioned pressure valve into the liquid to be treated and the content of the gas dissolved in the liquid is always kept in a predetermined level or more, because the pressure state is maintained till the pressure valve which is disposed at the leading end of the feed pipe positioned in the treated portion and which is opened at a pressure exceeding a predetermined level. Thus, the cleaning system according to the present invention can keep the predetermined pressure up to the leading end of the feed pipe for feeding the pressure liquid into the treated portion, the cleaning process can be carried out even at a position apart from the place of the pressure pump, the-gas-liquid mixing means and the pressure tank constituting the system by extending the aforementioned feed pipe, if necessary.

According to the cleaning system of the present invention, as described above, the pressure of the liquid can be kept at a predetermined level or more up to the leading end of the feed pipe for feeding the liquid containing the dissolved air to the treated portion, by attaching the pressure valve made openable at the predetermined pressure or more to the leading end of the feed pipe, so that the gas in the pressure liquid keeps dissolved until it is fed to the treated portion; and that the content of the gas dissolved in the pressure liquid can always exceed the predetermined level. And the gas dissolved in the pressure water changes into bubbles while being fed from the pressure valve to the treated portion B, so that these super-fine bubbles can efficiently stick to the floc in the liquid to be treated while being allowed to expand, to lift the floc so that the cleaning efficiency can be raised to a remarkably high level while retaining a constant cleaning action at all times. Moreover, since the pressure liquid keeps its high pressure up to the leading end of the feed pipe, as described above, the cleaning process can be carried out even at a position apart from the place of the pressure pump, the gas-liquid mixing means and the pressure tank by extending the aforementioned feed pipe, if necessary, so that the cleaning treatment can be accomplished anywhere.

The cleaning system according to the present invention described above can be used as it is as the oil-water separating system, while the pressure liquid is fed from the aforementioned feed pipe to the treated portion, the gas dissolved in the pressure water changes into bubbles and these fine bubbles rise while expanding in the treated portion to stick to the oil in the liquid to be treated thereby to lift the oil content.

DETAILED DESCRIPTION OF THE PREFERRED EMBODIMENTS

The present invention will be described in more detail in the following in connection with one embodiment of a cleaning system using an aerator according to the present invention. Incidentally, this cleaning system can achieve similar effects if it is used as it is as an oil-water separating system.

Figure 1:
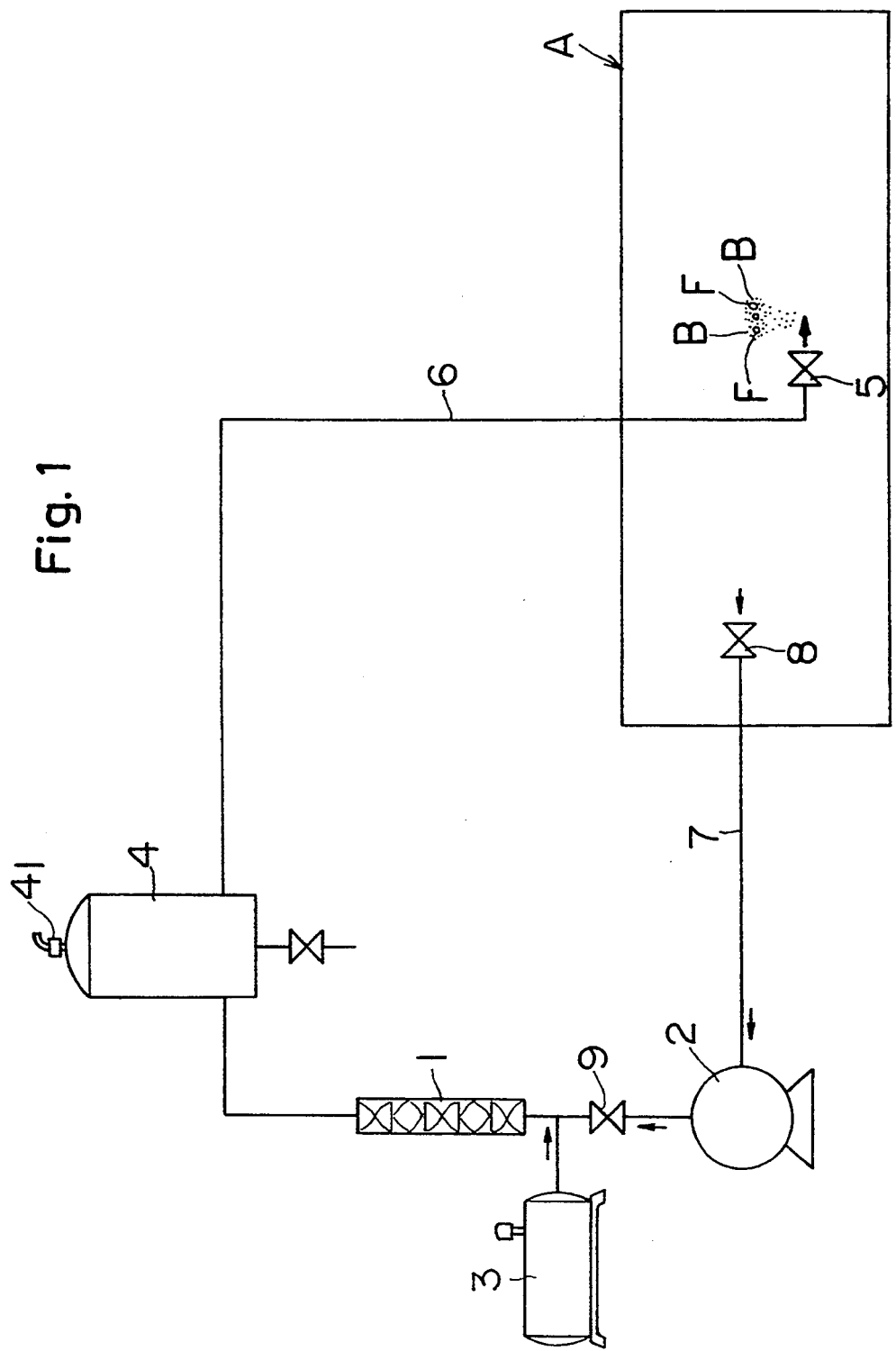
FIG. 1 is a layout diagram showing the overall arrangement of a cleaning system according to the present invention.

FIG. 1 is a layout diagram showing the overall arrangement of one embodiment of the cleaning system according to the present invention. Reference numeral 1 appearing in FIG. 1 designates vapor-liquid mixing means; numeral 2 designates a pressure pump for pumping a stock solution from a portion A to be treated such as rivers or lakes to the vapor-liquid mixing means; numeral 3 designates a compressor for feeding compressed air into the stock solution to be fed to the vapor-liquid mixing means 1 by the pressure pump 2; numeral 4 designates a pressure tank; and numeral 5 designates a pressure valve which is attached to the leading end of a feed pipe 6 connected to the pressure tank 4 and is opened at a predetermined pressure or higher.

The cleaning operations by the present cleaning system are as follows. A float valve 8 attached to the leading end of a sucking pipe 7 connected to the pressure pump 2 and the pressure valve 5 attached to the leading end of the feed pipe 6 are positioned in the treated position A. If, in this state, the stock solution is sucked from the treated portion A by the pressure pump 2 and is fed under pressure together with the compressed air from the compressor 3 to the vapor-liquid mixing means 1, the air from the compressor is mixed and dissolved into the stock solution sucked by the vapor-liquid mixing means 1. If this liquid under pressure is fed again from the pressure tank 4 via the feed pipe 6 and from the pressure valve 5 at the leading end to the treated portion A, then the fine gas dissolved in the pressure liquid feed changes into fine bubbles and these fine bubbles rise while inflating in the treated portion A. At this time the fine bubbles B stick to floc F to lift the floc F. In ease of this cleaning treatment, a suitable flocculating agent is added to the treated portion A.

The vapor-liquid mixing means 1 to be used in the cleaning system thus constructed mixes the stock solution, which is pumped from the treated portion A by the pressure pump 2, and the compressed air fed from the compressor 3, to mix and dissolve the air into the stock solution sucked from the treated portion A. The specific structure of the vapor-liquid mixing means 1 used can be exemplified by a well-known static mixer 10, as shown in FIGS. 2 and 3, or the vapor-liquid mixing device, as disclosed in Japanese Utility Model Laid-Open No. 112321/1990 filed by us.

Figure 2:
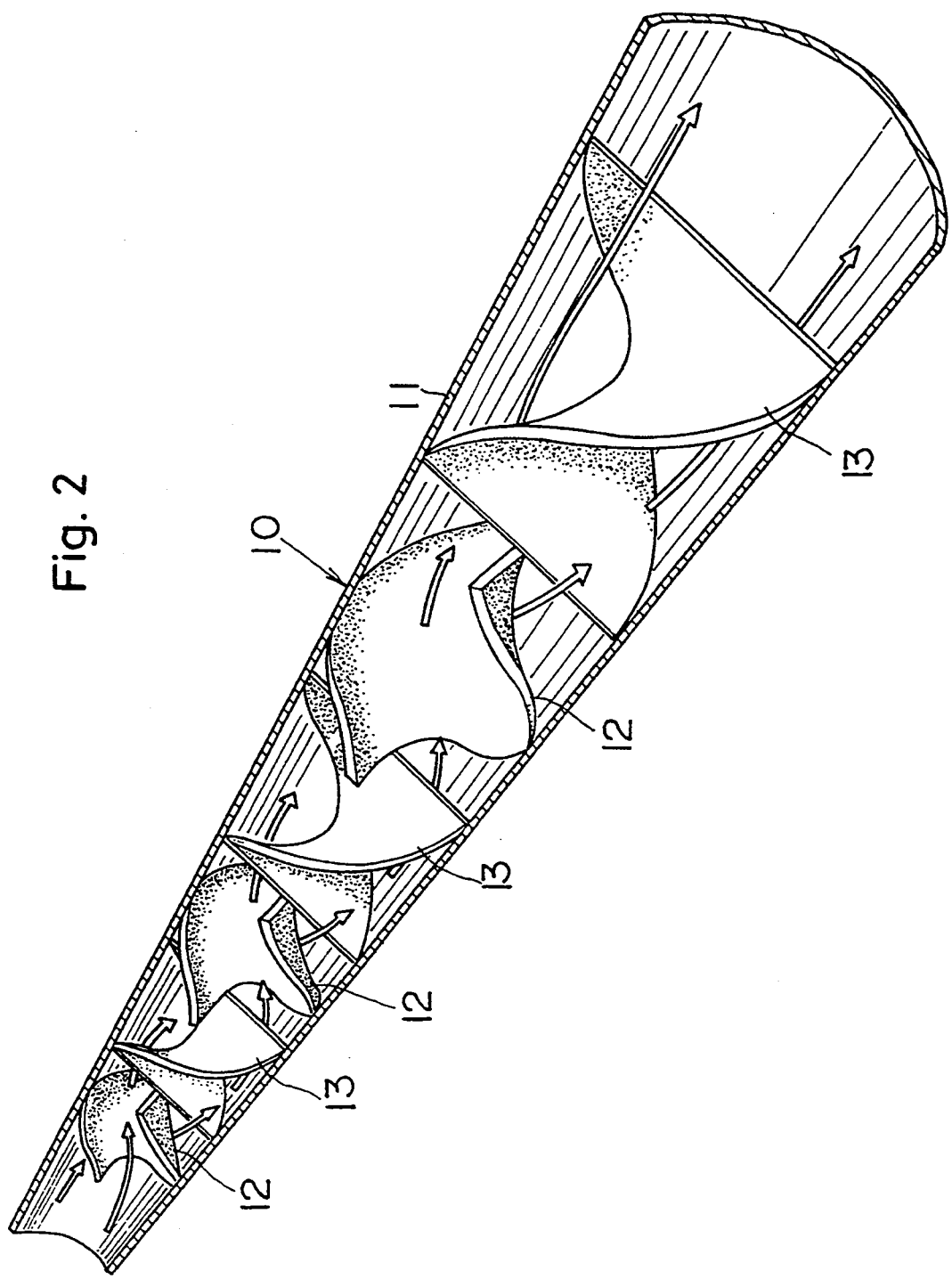
FIG. 2 is a partially sectional perspective view showing an essential portion of a static mixer exemplifying vapor-liquid mixing means to be used in the cleaning system.
Figure 3:
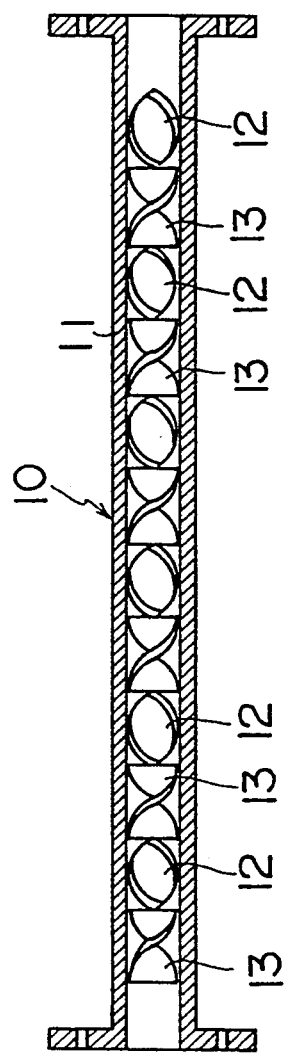
FIG. 3 is a sectional side elevation showing the static mixer.

The static mixer 10 shown in FIGS. 2 and 3 is arranged in its cylindrical housing 11 with a number of clockwise and counter-clockwise elements 12 and 13 of 180 degrees intersecting each other at a right angle. If the liquid and the compressed air are introduced under pressure into the aforementioned housing 11, they are split by the clockwise elements 12 and the counter-clockwise elements 13. Moreover, as the flows of the split liquid and compressed air are repeatedly turned alternately through the clockwise elements 12 and the counter-clockwise elements 13, they are mixed with each other and the air is dissolved in the liquid. In this case, furthermore, the flows of the liquid and compressed air are continuously moved from the center to the inner wall of the housing 11 and vice versa along the helical faces of the elements 12 and 13 so that the mixing efficiency is improved.

In the vapor-liquid mixing device disclosed in Japanese Utility Model Laid-Open No. 112321/1990, on the other hand, clockwise and counter-clockwise helical screws are so alternately fixed on a common shaft within a cylindrical container that their outer edges are held in close contact with the inner wall of the container. If, moreover, a liquid and air are simultaneously introduced into the container, they are guided forward while being rotated counter-clockwise by the counter-clockwise screw, and their rotating direction is abruptly subjected to a phase change to a clockwise direction by the clockwise screw so that they come into a turbulent state and are mixed with each other. The liquid and air are further guided forward while being rotated clockwise, and their rotating direction is abruptly phase-changed again by the counter-clockwise screw so that they come into a turbulent state and are further mixed together. These processes are repeated to dissolve them into the liquid.

The pressure pump 2 in the aforementioned cleaning system sucks up the stock liquid from the treated portion A and feeds it again to the treated portion A from the aforementioned vapor-liquid mixing means 1 through the pressure tank 4. The final pressure of this pressure pump 2 used usually reaches as high as about 5 to about 10 $Kg/cm^2$.

Incidentally, there may be disposed upstream of the pressure pump 2 an ejector, although not shown, for injecting air in advance into the liquid to be mixed with the compressed air coming from the compressor 3. This ejector is equipped with a nozzle, which is axially directed toward a converging portion formed at the central portion of a cylindrical container, and an inlet pipe which is disposed near the nozzle for introducing the air from the outside of the container into the nozzle. The ejector injects the liquid fed into the container toward the converging portion so that the air may be sucked from the inlet pipe and injected into the liquid by the vacuum and by diffusion of the jet flow. In case the ejector is thus disposed upstream of the pressure pump 2 to inject the air in advance, the liquid to be fed from the ejector into the pressure pump 2 while being roughly mixed with the air by employing a vortex pump having an impeller as the pressure pump 2 can be stirred by the vortex type pressure pump 2 to accelerate the dissolution of the air into the liquid more.

The compressor 3 in the aforementioned cleaning system compresses and introduces the air into the liquid, which is to be fed under-pressure to the vapor-liquid mixing means i by the aforementioned pressure pump 2 and can set the pressure of its compressed air suitably according to the pressure of the liquid under pressure. Incidentally, in case a gas other than the air is used, it can be sucked from its bomb and compressed as a supply. In this case, this bomb is commonly used for feeding the gas to the aforementioned ejector, too.

Moreover, the pressure-tank 4 of the aforementioned cleaning system reserves the liquid, in which the air is dissolved by the aforementioned vapor-liquid mixing means 1, under pressure. This pressure tank 4 has a function to open the excess air left undissolved in the pressure liquid to the outside from an air out silencer 41 which is disposed at the upper end of the pressure tank 4. In this case, air or another inexpensive and harmless gas is employed as the gas, it is released directly to the atmosphere. However, another hazardous gas or expensive gas, if used, is recovered to the air out silencer 41 into a recovery tank or the like.

Still moreover, the pressure valve 5 attached to the leading end of the feed pipe 6 connected to the aforementioned pressure tank 4 is constructed to be opened, when the liquid fed from the feed pipe 6 exceeds a predetermined pressure, to feed the liquid under pressure from the feed pipe 6 into the treated portion A, but is left closed if the liquid to be fed from the feed pipe 6 has a pressure lower than said predetermined level. Thus, by equipping the feed pipe 6 with the pressure valve 5 which is not opened before the predetermined pressure is exceeded, the pressure of the liquid to be fed to the treated portion A can always be maintained at the predetermined level or more. As a result, it is possible to keep the amount of air dissolved in the pressure liquid in a constant or higher concentration at all times and to produce the very fine bubbles in the treated portion A. Thus, the fine bubbles can stick to the floc to lift them efficiently. Since, moreover, the pressure of the liquid can always be held at the predetermined level or more so far as the leading end of the feed pipe 6 disposed in the treated portion A, a predetermined cleaning effect can be expected, and this cleaning operation can be effected by suitably elongating and shifting the feed pipe 6 to a desired position no matter where the treated portion A might be positioned.

Figure 4:
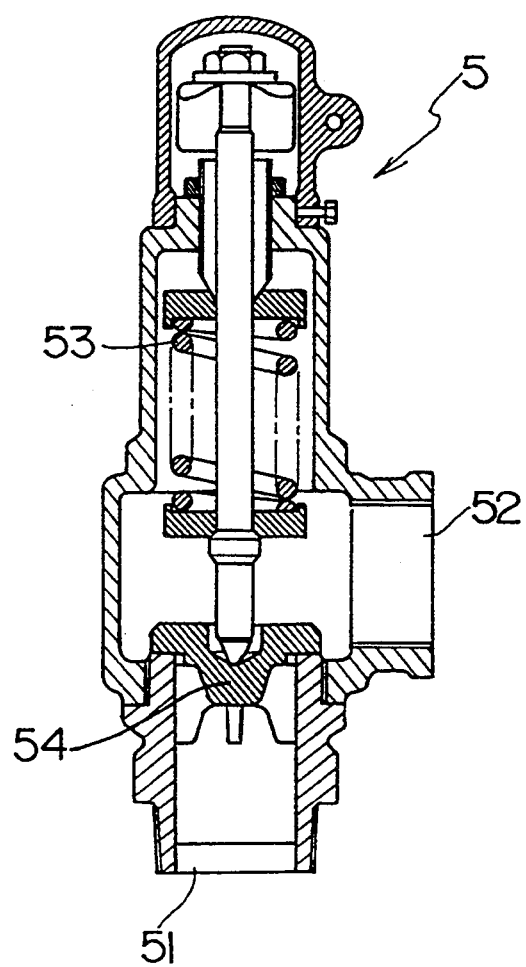
FIG. 4 is a sectional side elevation showing a pressure valve to be used in the cleaning system.

The pressure valve 5 to be used can be exemplified by one shown in FIG. 4. This pressure valve 5 is constructed to shut off the communication between an inlet 51 connected to the feed pipe 6 and an outlet 52 opened to the treated portion A, elastically by means of a valve member 54 which is urged by a spring 53. As a result, when the pressure liquid containing the dissolved air and flowing from the feed pipe 6 to the inlet 51 exceeds a predetermined pressure, the valve member 54 is opened against the urging force of the spring 53 by the pressure of the liquid so that the liquid is introduced from the outlet 52 into the treated portion A. This pressure valve 5 is usually used as a safety valve for maintaining the pressure of the liquid in the pipe under a predetermined pressure or less. In the present invention, however, the pressure valve 5 is used to keep the pressure of the liquid, which is to be fed from the feed pipe 6 into the treated portion A at a predetermined pressure or more at all times by attaching it to the leading end of the feed pipe 6. In the present cleaning system, moreover, the pressure valve 5 to be used may preferably be opened if the pressure of the liquid exceeds 7 $Kg/cm^2$.

Incidentally, reference numeral 9 appearing in FIG. 1 designates a check valve for preventing the stock liquid to be fed from the pressure pump 2 from flowing backward from the vapor-liquid mixing means 1 toward the pressure pump 2.

Although the present invention has been described in connection with the cleaning system, an oil-water separating system may have absolutely the same construction as that of the cleaning system. In case of the oil-water separating system, the gas dissolved in the pressure liquid to be fed from the pressure valve 5 at the leading end of the feed pipe 6 changes into the very fine bubbles in the treated portion A and these very fine bubbles stick to the oil in the liquid to be treated, while expanding to rise in the treated portion A, to lift the oil so that they separate the oil and the water in the treated liquid.

What is claimed is:

1. A bubbling system apparatus comprising: a sucking pipe; gas-liquid mixing means connecting to said sucking pipe; a pressure pump disposed midway of said sucking pipe; compressor means connected to the connection between said pressure pump and said gas-liquid mixing means for introducing a gas into said sucking pipe; a pressure tank connected to said gas-liquid mixing means; a feed pipe connected to said pressure tank; and a pressure valve, attached to the leading end of said feed pipe, said pressure valve including means for biasing said valve in a closed position until a predetermined pressure of about 7 kg/cm$^2$ is exceeded whereafter the pressure opens the valve.

2. A bubbling system apparatus according to claim 1, wherein said gas-liquid mixing means includes a static mixer having clockwise helical elements of 180 degrees and counter-clockwise helical elements of 180 degrees so arranged in a cylindrical housing alternately to intersect each other.

3. A bubbling system apparatus according to claim 1, wherein said gas-liquid mixing means includes a clockwise helical screw and a counter-clockwise helical screw arranged in a cylindrical housing such that they are alternately fixed on a common shaft while having their outer edges closely contacting with the inner wall of said housing.

4. A bubbling system apparatus according to claim 1, further comprising a cheek valve interposed between said vapor-liquid mixing means and said pressure pump.

5. A bubbling system apparatus according to claim 1, further comprising a float valve attached to the leading end of said sucking pipe.

6. A bubbling system apparatus according to claim 1, wherein said pressure tank has an air out silencer.

7. A cleaning system apparatus comprising: a pressure pump for sucking and feeding a stock liquid, the stock liquid being sucked from a portion to be treated by a sucking pipe, the sucked stock liquid being fed to gas-liquid mixing means; compressor means for feeding a compressed gas into the stock liquid to be fed to said gas-liquid mixing means by said pressure pump; said gas-liquid mixing means for mixing the treated stock liquid fed by said pressure pump and the compressed gas fed from said compressor means, to mix and dissolve the gas into the liquid; a pressure tank means for receiving the pressure liquid having said gas mixed and dissolved therein and for reserving the pressure liquid having said gas mixed and dissolved therein; a feed pipe means for feeding the pressure liquid of said pressure tank means to said treated portion; and a pressure valve attached to the leading end of said feed pipe means which includes means for biasing said valve in a closed position until a predetermined pressure of about 7 kg/cm$^2$ is exceeded whereafter the pressure opens the valve.

8. An oil-water separating system apparatus comprising: a pressure pump for sucking and feeding a stock liquid, the stock liquid being sucked from a portion to be treated by a sucking pipe, the sucked stock liquid being fed to vapor-liquid mixing means; compressor means for feeding a compressed gas into the stock liquid to be fed to said vapor-liquid mixing means by said pressure pump; said vapor-liquid mixing means for mixing the treated stock liquid fed by said pressure pump and the compressed gas fed from said compressor means, to mix and dissolve the gas into the liquid; a pressure tank means for receiving the pressure liquid having said gas mixed and dissolved therein and for reserving the pressure liquid having said gas mixed and dissolved therein; a feed pipe means for feeding the pressure liquid of said pressure tank means to said treated portion; and a pressure valve attached to the leading end of said feed pipe means which includes means for biasing said valve in a closed position until a predetermined pressure of about 7 kg/cm$^2$ is exceeded whereafter the pressure opens the valve.

9. A bubbling system apparatus according to claim 1, wherein the leading end of the feed pipe opens to an open body of water.

10. A bubbling system apparatus according to claim 9, wherein the open body of water is a river or lake.

11. A bubbling system apparatus consisting essentially of: a sucking pipe; gas-liquid mixing means connecting to said sucking pipe; a pressure pump disposed midway of said sucking pipe; compressor means connected between said pressure pump and said gas-liquid mixing means for introducing a gas into said sucking pipe; a pressure tank connected to said gas-liquid mixing means; a feed pipe connected to said pressure tank; and a pressure valve, attached to the leading end of said feed pipe, which includes means for biasing said valve in a closed position until a predetermined pressure of about 7 kg/cm$^2$ is exceeded whereafter the pressure opens the valve.

* * * * *